United States Patent [19]

Lahti

[11] 4,410,150

[45] Oct. 18, 1983

[54] DRAG-REDUCING NACELLE

[75] Inventor: Daniel J. Lahti, Cincinnati, Ohio

[73] Assignee: General Electric Company, Cincinnati, Ohio

[21] Appl. No.: 368,242

[22] Filed: Apr. 14, 1982

Related U.S. Application Data

[63] Continuation of Ser. No. 126,779, Mar. 3, 1980, abandoned.

[51] Int. Cl.$^3$ ............................................. B64D 29/02
[52] U.S. Cl. .................................. 244/53 R; 60/226.1; 239/265.19; 244/130
[58] Field of Search ............. 60/226 R, 226 A, 226 B; 244/130, 53 R, 53 B; 239/265.43, 265.33, 265.19

[56] References Cited

U.S. PATENT DOCUMENTS

| | | | |
|---|---|---|---|
| 3,533,237 | 10/1970 | Rabone et al. | 60/226 |
| 3,670,964 | 6/1972 | Pedersen | 239/265.19 |
| 3,699,682 | 10/1972 | Kleckner | 60/226 A |
| 3,881,315 | 5/1975 | Hess et al. | 60/226 R |
| 3,897,001 | 7/1975 | Helmintoller, Jr. et al. | 239/265.13 |
| 4,080,785 | 3/1978 | Koff et al. | 60/226 B |

FOREIGN PATENT DOCUMENTS

| | | |
|---|---|---|
| 1211192 | 11/1970 | United Kingdom . |
| 1420625 | 1/1976 | United Kingdom . |
| 1468726 | 3/1977 | United Kingdom . |
| 1493049 | 11/1977 | United Kingdom . |
| 1522558 | 8/1978 | United Kingdom . |

OTHER PUBLICATIONS

Oct. 31, 1978–single page from Flight Operators Conference, General Electric Company.

*Primary Examiner*—Sherman D. Basinger
*Attorney, Agent, or Firm*—Donald W. Walk; Francis L. Conte; Derek P. Lawrence

[57] ABSTRACT

A wing-mounted gas turbofan engine is provided with an exhaust system that reduces airflow drag during subsonic aircraft flight operation. The system reduces drag by turning the engine bypass exhaust stream away from the underside of the airplane wing to lessen its tendency to reduce air pressure under the wing. Low pressure below the airplane wing has a detrimental effect on wing lift which, in turn, causes greater airflow drag. The exhaust system construction lessens its pressure lowering influence by first, inwardly curving the exhaust system exit to turn the bypass flow away from the airplane wing; second, by predetermining the location of a nozzle throat within the bypass stream to control exit exhaust pressure so as to match outside air pressure and third, by decreasing the diameter of a portion of the engine nacelle just downstream of the bypass exhaust stream exit to provide a flow region for the exhaust that is further from the airplane wing.

4 Claims, 5 Drawing Figures

DRAG-REDUCING NACELLE

This application is continuation of application Ser. No. 126,779, filed Mar. 3, 1980, now abandoned.

BACKGROUND OF THE INVENTION

1. Field of the Invention

This invention relates to nacelle and exhaust system duct construction for gas turbofan aircraft engines.

2. Summary of the Prior Art

It is well known that lifting forces are produced by an aircraft wing during flight as a result of a pressure differences acting over the wing platform. As the wing passes through a volume of air, relatively high air pressure is developed below the wing and relatively low air pressure is developed above the wing. In general, the greater the difference in pressure between the upper surface and lower surface of the wing, the greater the lift produced by the wing. It is also well known that as the airplane is more steeply angled, the angle of attack of the wing is increased, and the pressure differences and lift are correspondingly increased. Unfortunately, an increase in angle of attack also has a corresponding effect on aerodynamic drag produced by the wing. Because the angle of attack of the wing is increased to produce more lift, the wing projects a greater frontal area causing the increase in drag.

When an aircraft is traveling at subsonic speeds, an engine that is positioned beneath the aircraft wing causes the local wing underside pressures to be lower than what they would be under the same wing without the engine. This localized lowering of the underside pressure results in a decreased pressure differential and reduces the wing lift for a given angle of attack. Since a given aircraft requires a fixed amount of lift to maintain altitude at a given cruise velocity, the wing angle of attack must be increased to regain that amount of lift which is lost due to the presence of the engine nacelle. As expected, this increase in the angle of attack required to offset the lift loss caused by the engine results in another increase in aerodynamic drag. Those skilled in the art commonly refer to this drag produced by the presence of the nacelle under the wing as "interference drag."

Analysis of interference drag has revealed that different engine nacelle shapes may have similar or identical isolated drag by themselves in an airstream, but can have very different effects on a wing pressure distribution, and thus create widely differing amounts of interference drag. Further analysis has been directed at understanding these differences and the causes of this interference drag. The results of this analysis indicate that efforts should be directed towards minimizing the effect of engine fan exhaust systems on wing pressure distribution for the purpose of reducing interference drag.

SUMMARY OF THE INVENTION

It is, therefore, an object of the present invention to provide a new and improved exhaust system for a gas turbine engine that is effective for reducing aerodynamic drag.

It is another object of the present invention to reduce interference drag caused by wing-mounted aircraft engines.

It is another object of the present invention to minimize the effect of wing-mounted engine fan exhaust systems on the pressure distribution underneath an airplane wing.

It is still another object of the present invention to modify engine nacelle and fan exhaust construction for the purpose of improving the effect of the engine fan exhaust system on air pressure beneath the airplane wing during subsonic aircraft operation.

These and other objects will be more fully understood from the drawings and from the following description, all of which are intended to be representative of, rather than in any way limiting on, the scope of the invention.

An improved exhaust system for a gas turbine engine is provided that is effective for reducing aerodynamic drag. The exhaust system comprises annular, coaxially disposed first and second flowpath members that define a converging-diverging nozzle having a nozzle exit effective for discharging gases over a conical aft portion of the first flowpath member in a generally aft direction. An inner surface of an aft portion of the second flowpath member has a downstream portion that extends aft and radially inwardly from a position opposite to a maximum radius portion of the first flowpath member for directing the gases radially inwardly. A diverging section of the converging-diverging nozzle has a predetermined length for substantially matching pressure of the gases at the nozzle exit with pressure of air flowing over the second flowpath member.

According to one embodiment of the invention, an improved bypass air exhaust system for a wing-mounted turbofan engine is provided. The first and second flowpath members comprise a core cowl disposed about a turbine section and a fan cowl disposed about a fan section of the engine, respectively. The bypass air exhaust system is effective for reducing aerodynamic drag including interference drag between the engine and the wing.

More specifically, according to this embodiment of the present invention, the engine nacelle and bypass duct construction is modified for the purpose of redirecting bypass exhaust air to minimize its influence on wing underside pressures. First, the inner profile of the bypass duct is curved radially inward at its aft end for the purpose of physically turning the bypass flow radially inward and away from the underside of the wing. Second, a nozzle throat is formed within the bypass duct at a more upstream position in respect to previous practice. The throat is located upstream at a particular location to obtain a bypass duct exit pressure that closely matches outside air pressure, so the exhaust doesn't expand and flow in the direction of the wing. Third, the outer diameter of a portion of the nacelle that is located immediately downstream of the bypass duct exit is reduced in diameter and curved radially inward to provide a flow region for the exhaust stream at a location that is more distant from the airplane wing.

DESCRIPTION OF THE DRAWINGS

While the specification concludes with the claims distinctly claiming and particularly pointing out the invention described herein, it is believed that the invention will be more clearly understood by reference to the discussion below in conjunction with the following drawings:

DESCRIPTION OF THE PREFERRED EMBODIMENT

Figure 1:
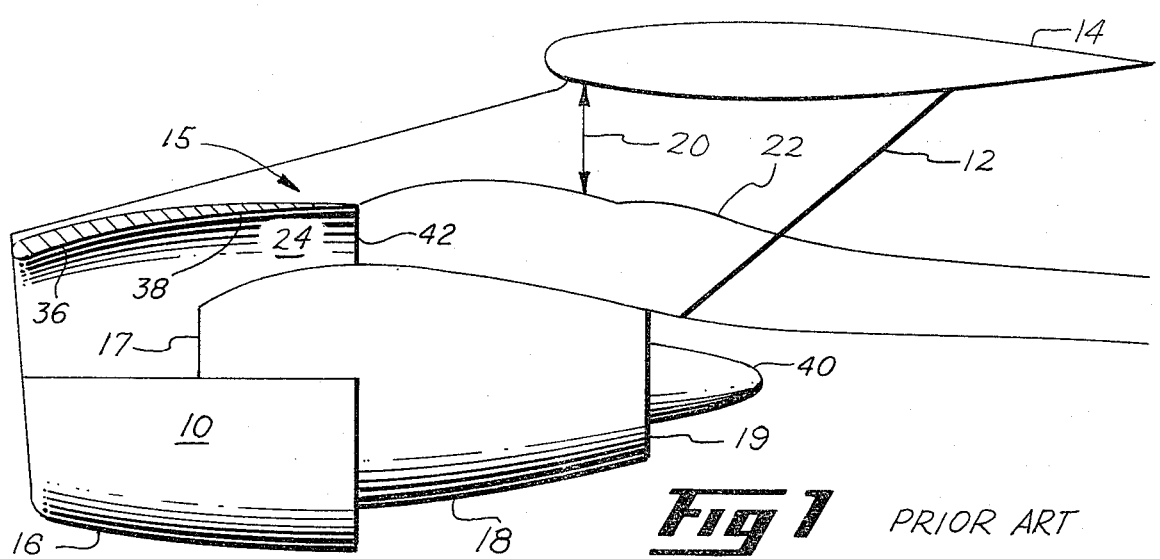
FIG. 1 is an elevation view of a prior art wing-mounted turbofan engine and its associated exhaust flow stream pattern.

Referring now to FIG. 1, a conventional wing-mounted gas turbofan engine 10 is shown suspended by a pylon 12 from an airplane wing 14. An aircraft with the engine and wing arrangement shown in FIG. 1 is designed for subsonic operation. The engine 10 is a typical high-bypass turbofan aircraft engine that has an outer covering or nacelle 15 comprising a relatively large radius fan cowl 16 at its upstream or forward portion and a relatively smaller radius core cowl 18 at its downstream or aft region. The fan cowl 16 comprises a forward portion 36 which covers a fan section of the engine (not completely shown) where rotating fan blades accelerate a large volume of air in an aft direction. Some of this air that is accelerated by the fan bypasses a turbine section of the engine and is exhausted from an aft section, or portion, 38 of the fan cowl 16 in the region radially surrounding the core cowl 18. The remaining portion of the fan air is drawn at inlet 17 into the turbine section of the engine where it is used in the combustive processes to produce engine power. After flowing through the turbine, gases resulting from the combustive processes are exhausted farther downstream out an aft end 19 of the core cowl 18.

More specifically, as is well known in the art turbine exhaust gases are discharged through a core exhaust nozzle defined between the aft end 19 of the core cowl 18 and a centerbody 40 which comprises an annular flowpath member disposed coaxially with and spaced radially inwardly from the core cowl 18.

Analysis has shown that there are at least three major factors that influence the mutual interaction between external subsonic airflow adjacent to the lower surface of the wing 14 and supersonic airflow that is discharged from the aft end of the fan cowl 16. Referring again to FIG. 1, a first factor is minimum physical distance, generally indicated by arrow 20, between the wing lower surface and what is referred to as a dividing streamline 22. This dividing streamline is a boundary between fan airflow exhausted from the fan cowl 16, and surrounding ambient airflow that passes around the outside of the fan cowl 16. This dividing streamline is also known to those skilled in the art as a "slip line" and is shown in its normal position during flight cruise conditions by the wavy line 22.

A second factor is overall pressure ratio of the fan airflow exiting the fan cowl in respect to ambient air pressure ($P_{T/FAN}/P_o$). $P_{T/FAN}$ represents the stagnation pressure of the exhausted fan airflow, and $P_o$ represents the ambient static air pressure.

A third factor is the Mach number of the ambient airflow which passes externally around the fan cowl 16.

Figure 2:
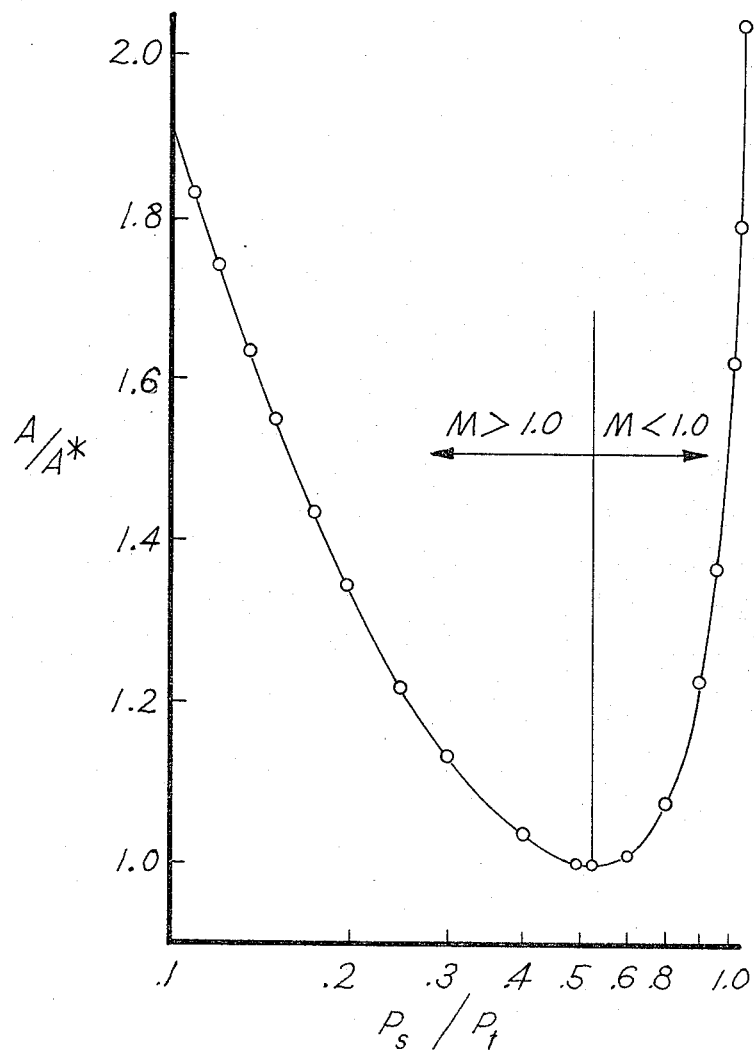
FIG. 2 is a graphical representation of local static air pressure ($P_s$) as a function of cross-sectional area (A) in a nozzle or channeled flowpath.

The flow of ambient air between the lower surface of the wing 14 and the dividing streamline 22 is similar in some respects to flow of air through a duct of varying cross-sectional area. This changing cross-sectional area creates a "channeling" effect on ambient air flowing between the engine and wing which is similar to the effect caused by a nozzle. Referring now to FIG. 2, variation of local static pressure ($P_s/P_t$) in a channel or nozzle is shown as a function of a cross-sectional flow area that approximates the cross-sectional area between the wing lower surface and the dividing streamline 22 in FIG. 1. In explanation of FIG. 2, A is the local cross-sectional area, A* is a reference throat or minimum area of that "channel" between the wing and engine, $P_s$ is local static pressure, and $P_t$ is stagnation pressure for a given flow. Both A* and $P_t$ are constant for a given flow rate through the duct. The graph shows that when the flow upstream of the throat (A*) is subsonic (M<1.0), a decrease in the duct area causes a decrease in the local static pressure ($P_s$), and when the upstream flow is supersonic (M<1.0), an increase in duct area causes a further decrease in static pressure. This behavior is typical of airflow through a nozzle and is well known among aeronautical and mechanical engineers. The important feature of this physical phenomenon is that a channeled area or nozzle creates a rapid decrease in local static pressure ($P_s$) as airflow goes from subsonic (M<1.0) to supersonic (M<1.0). This is what occurs between an aircraft wing and an aircraft engine. When static pressure drops because of this nozzle effect in the region below an airplane wing, an adverse effect is created on wing lift.

Referring again to FIG. 1, the flow between the lower surface of the wing 14 and the dividing streamline 22 behaves in a manner very similar to the flow through a duct of varying area as described above. Starting at a leading edge of the wing 14, it can be readily appreciated that the distance between the wing lower surface and the dividing streamline 22 decreases down to a minimum value at some axial location aft of the wing leading edge, generally shown at arrow 20 in FIG. 1. The presence of the engine nacelle 15 and the trailing dividing streamline near the underside of the wing 14 creates this "channel" or "nozzle" with a throat at the location of arrow 20. The magnitude of the pressure reduction, and the magnitude of the loss of lift to the aircraft, is a function of nacelle position and the position of the fan jet dividing streamline 22 relative to the wing 14. The more the streamline 22 "billows out" and approaches the lower wing surface, the greater the reduction in area between the wing 14 and dividing streamline 22, and thus the lower the air pressure under the wing 14. If the position of the engine nacelle is fixed, the position of the fan jet dividing streamline 22 must be altered to decrease lift loss, allowing the aircraft to maintain a lower angle of attack and reduce the corresponding induced aerodynamic drag.

There are at least three factors that can be altered by engine designers that have an effect on the shape of the fan jet dividing streamline 22. These are the pressure of fan air exhaust, the shape of the trailing edge of the fan cowl 16, and the shape of the outer surface of the core cowl 18.

Figure 3:
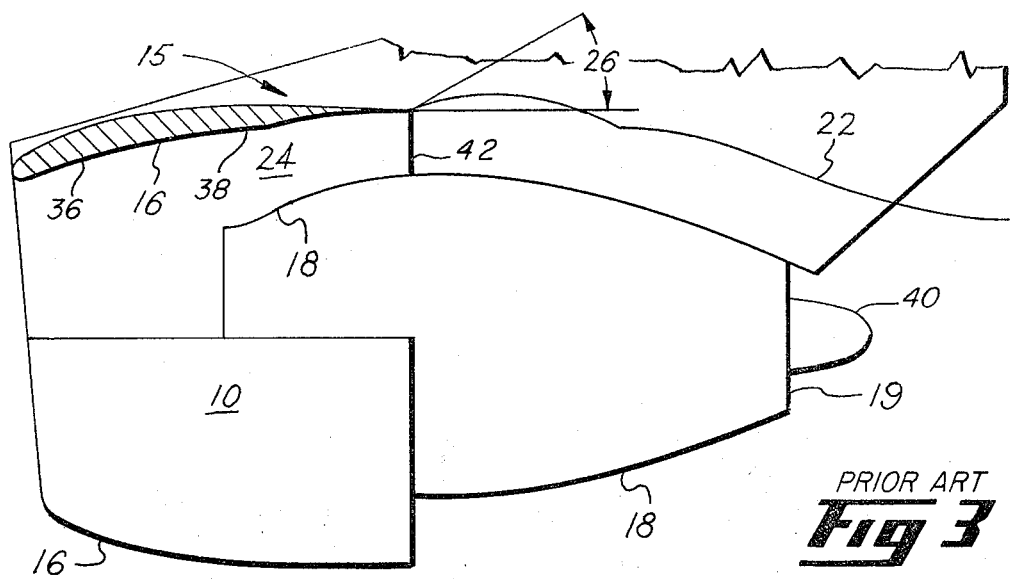
FIG. 3 is a view of a prior art gas turbofan engine, partly in cross section and partly broken away, and the engine's fan air bypass flow stream pattern.

Referring now to FIG. 3, a portion of the trailing edge of the fan cowl 16 and a portion of the core cowl 18 is shown for the purpose of explaining the influence of these three factors on the fan jet dividing streamline 22. The space between the aft portion of the fan cowl 16 and a forward portion of the core cowl 18 is called a bypass duct 24. The bypass duct encloses the path taken by the fan air that bypasses the turbine section of the engine.

More generally, the core cowl 18 and the fan cowl 16 comprise annular, first and second flowpath members, respectively, which are coaxially disposed and radially spaced for defining a fan air exhaust nozzle, or bypass duct 24, therebetween. The exhaust nozzle includes a fan nozzle, or duct, exit 42 defined by the aftmost end of the fan cowl 16 and an oppositely facing surface of the core cowl 18.

The lines projected from the bypass duct at the aft tip of the fan cowl 16 are provided for the purpose of showing the influences of initial discharge angle, shown as 26 in FIG. 3, and the exit static pressure ratio, on the shape of the dividing streamline 22. It can be readily appreciated from the drawing that the larger the initial discharge angle 26, the larger the maximum diameter of the dividing streamline. Similarly, the higher the exit static pressure ratio $P_E/P_o$ (static pressure at exit/static pressure outside the fan cowl), the larger the maximum diameter of the dividing streamline. The exit pressure ($P_E$) will affect the dividing streamline because gas exiting at a higher pressure will have a greater tendency to expand radially outwardly into the surrounding airflow.

Finally, the larger the radius of the core cowl 18 relative to the engine centerline, the more the core cowl will physically force the bypass flow radially outward thereby increasing the maximum diameter of the dividing streamline. Because an increase in the maximum diameter of the dividing streamline 22 reduces the flow area between the wing lower surface and the streamline 22, pressure below the wing surface is reduced and there is an induced drag penalty as explained earlier. Any change in the construction of the fan cowl 16, bypass duct 24, and core cowl 18, which would decrease the maximum diameter of the dividing streamline 22, will have a corresponding beneficial effect on wing lift, thereby decreasing induced drag. This is the object of the present invention.

Figure 4:
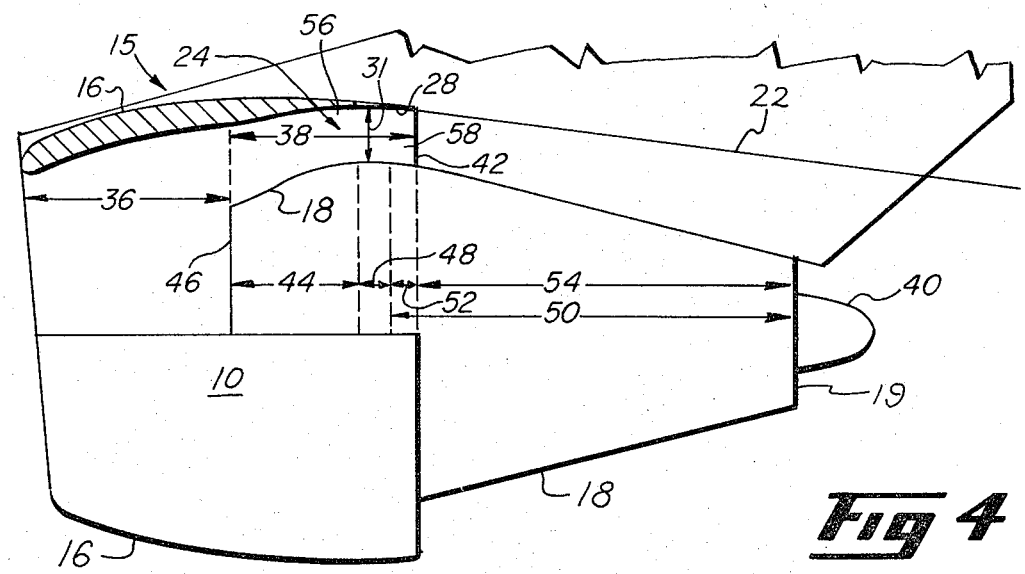
FIG. 4 is a view of a gas turbofan engine, partly in cross section and partly broken away, that incorporates the present invention, and the engine's fan air bypass flow stream pattern.

Referring now to FIG. 4, a cross-sectional view of a turbofan engine 10 is shown that incorporates one embodiment of the present invention. More specifically, the core cowl 18 comprises a forward portion 44 having an outer radius increasing from a forward end 46 of the core cowl 18 to an intermediate portion 48 having a maximum radius or diameter. The core cowl 18 further includes an aft portion 50 comprising a first aft portion 52 and a second aft portion 54 disposed axially adjacently to each other. The outer radius of the core cowl 18 decreases from the intermediate portion 48 along the first aft portion 52 and the second aft portion 54 to the aft end 19 of the second aft portion 54 of the core cowl 19. The aft portion 38 of the fan cowl 16 includes an inner surface radially spaced from and surrounding the forward portion 44, intermediate portion 48 and the first aft portion 52 of the core cowl 18 and defines therebetween a converging section 56, throat section 31 and diverging section 58, respectively, of a converging-diverging nozzle portion of the bypass duct 24. The duct exit 42 discharges fan bypass air over the second aft portion 54 of the core cowl 18 in a generally aft direction.

The invention utilizes three separate constructional features that improve the engine's bypass air exhaust system to reduce the maximum radius of the dividing streamline 22 and thus reduce drag. First, the trailing edge of the inner surface of the fan cowl 16 which forms the outer surface of the aft end of the bypass duct 24, is reformed so that the downstream portion 28 of the fan cowl is curved radially inward for the purpose of directing the fan exhaust flow radially inward in respect to engine centerline. In the embodiment shown in FIG. 4, the downstream portion 28 is curved radially inwardly from a position opposite the maximum radius, or intermediate portion, 48 of the core cowl 18 to the end of the bypass duct 24.

The second feature of the present invention is a reconstruction of the flow area distribution at the aft end of the bypass duct 24. This is accomplished by moving the minimum cross-sectional area or nozzle throat 31 upstream or forward of the bypass duct exit 42 so that the throat of the nozzle is not located where the bypass flow exhausts into the surrounding ambient air. By moving the nozzle throat forward, the flow area distribution at the downstream end of the bypass duct is increasing, thereby forming a converging-diverging nozzle as above-described. Because the bypass flow at the throat 31 of the nozzle is choked, the bypass flow in the diverging section 58 of the nozzle expands and loses pressure in the downstream direction. The length of the diverging section 58 is carefully predetermined such that the pressure at the nozzle exit 42 is approximately equal to the ambient airstream pressure at the exit of the fan cowl 16 during aircraft cruise operation. This provides an exit static pressure ratio ($P_E/P_o$) of approximately 1.0. An exit static pressure ratio of 1.0 causes the nozzle discharge angle of the bypass flow to be essentially equal to the angle of the inner wall of the fan cowl at 28. If this pressure ratio were greater than 1.0, the discharge angle would be greater than the wall angle, thus causing the jet plume to billow out relative to the bypass wall angle.

The third feature of the present invention that reduces the maximum diameter of the dividing streamline is a reconstruction of the shape of the conic core cowl 18. Essentially, the conic core cowl 18 is provided with a steadily decreasing outer radius from the nozzle throat 31, or intermediate portion 48 of the core cowl 18, to the aft end 19 of the core cowl 18. For a given amount of bypass flow passing over any core cowl at a given pressure ratio, the cowl with a lesser maximum outer radius will generally produce a lesser dividing streamline maximum diameter. A reduction in core cowl radius provides a flow area for the fan exhaust stream that is closer to the engine's centerline and further from the airplane wing. This relocated flow area contributes to the effect of relocating the dividing streamline 22 farther from the airplane wing 14.

Figure 5:
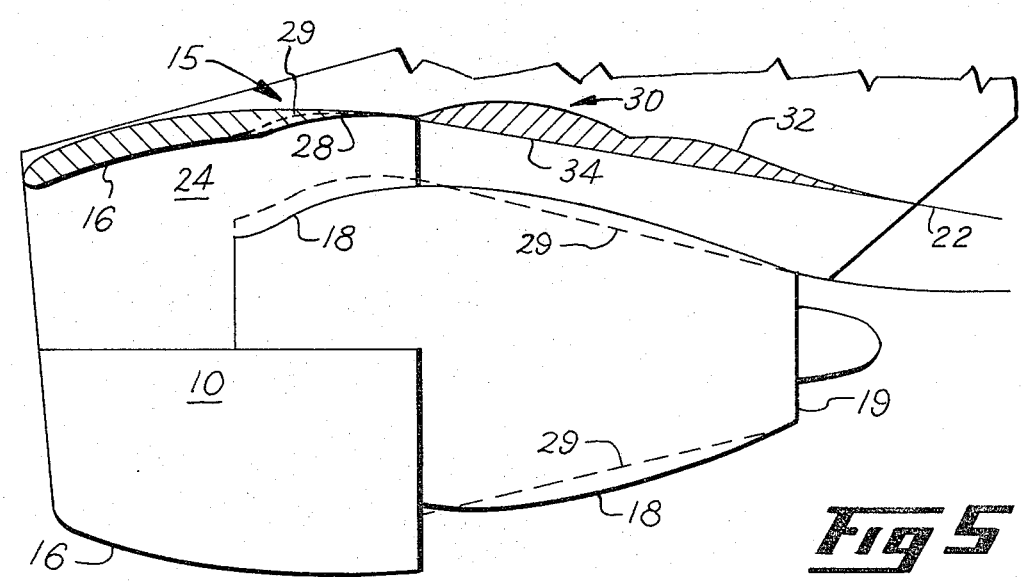
FIG. 5 is a cross-sectional view of the gas turbofan engine shown in FIG. 3 overlayed with a dashed outline of the gas turbofan engine of FIG. 4 that incorporates the present invention.

Referring now to FIG. 5, the engine and nacelle employing the present invention from FIG. 4 is superimposed in dashed outline 29 on the prior art engine and nacelle of FIG. 3. The differences in construction of the fan cowl 16, core cowl 18, and the downstream portion of the fan cowl 28, can be readily appreciated. A region that separates the dividing streamlines of the two engines is additionally shown with a cross-hatched section 30. The outer perimeter 32 of this cross-hatched section is the dividing streamline location for the prior art engine, and the inner perimeter 34 is the dividing streamline location for an engine employing the present invention. The difference in proximity to the airplane wing is readily apparent.

While specific embodiments have been described, it will be apparent to those skilled in the art that various modifications thereto can be made without departing from the scope of the invention, as recited in the appended claims. The scope of the invention, therefore, is to be derived from the following claims.

Having described the invention, what is claimed as novel and desired to be secured by Letters Patent of the United States is:

1. For a gas turbine engine effective for powering an aircraft, an exhaust system comprising:

an annular, first flowpath member comprising a forward portion having an outer radius increasing from a forward end of said first flowpath member to an intermediate portion thereof having a maximum radius; said first flowpath member further including a conical aft portion comprising first and second axially adjacent conical aft portions having an outer radius decreasing from said intermediate portion along said first and second aft portions, respectively, to an aft end of said second aft portion of said first flowpath member; and an annular, second flowpath member disposed coaxially with and spaced radially outwardly from said first flowpath member for defining therebetween an exhaust nozzle, said second flowpath member including an aft portion having an inner surface radially spaced from and surrounding said forward, intermediate and first aft portions of said first flowpath member and defining therebetween converging, throat and diverging sections, respectively, of a converging-diverging nozzle portion of said exhaust nozzle, said exhaust nozzle having a nozzle exit at a downstream end thereof for exhausting gases over said second aft portion of said first flowpath member in a generally aft direction, said gases forming a dividing streamline with airflow flowing over an outer surface of said second flowpath member during aircraft cruise operation, said streamline extending in an aft direction from an aftmost end of said second flowpath member;

said throat section being disposed upstream of said nozzle exit, and said inner surface of said aft portion of said second flowpath member having a downstream portion extending aft and radially inwardly from a position opposite said intermediate portion of said first flowpath member for directing said gases radially inwardly with respect to a central engine axis;

said diverging section having a predetermined length effective for substantially matching a pressure of said gases at said nozzle exit with a pressure of said airflow; and said converging-diverging nozzle, said downstream inner surface portion of said second flowpath member and said conical aft portion of said first flowpath member being effective for causing said dividing streamline to slope radially inwardly from said aftmost end of said second flowpath member for reducing aerodynamic drag during aircraft cruise operation.

2. The exhaust system according to claim 1 wherein said first flowpath member comprises a core cowl disposed about a turbine section of the engine, said second flowpath member comprises a fan cowl, and said exhaust nozzle comprises a fan bypass duct effective for discharging bypass air from said gas turbine engine.

3. An improved bypass air exhaust system for an aircraft gas turbofan engine including a fan section and a turbine section comprising:

a core cowl disposed about said turbine section and comprising a forward portion having an outer radius increasing from a forward end of said core cowl to an intermediate portion thereof having a maximum radius; said core cowl further including a conical aft portion comprising first and second axially adjacent conical aft portions having an outer radius decreasing from said intermediate portion along said first and second aft portions, respectively, to an aft end of said second aft portion of said core cowl; and a fan cowl comprising a forward portion disposed about said fan section and an aft portion having an inner surface radially spaced from and surrounding said forward, intermediate and first aft portions of said core cowl and defining therebetween converging, throat and diverging sections, respectively, of a converging-diverging nozzle portion of a bypass duct having a duct exit at a downstream end thereof for exhausting fan bypass air over said second aft portion of said core cowl in a generally aft direction, said fan bypass air forming a dividing streamline with airflow flowing over an outer surface of said fan cowl during aircraft cruise operation, said streamline extending in an aft direction from an aftmost end of said fan cowl;

said throat section being disposed upstream of said duct exit, and said inner surface of said aft portion of said fan cowl having a downstream portion extending aft and radially inwardly from a position opposite said intermediate portion of said core cowl for directing said fan bypass air radially inwardly with respect to a central engine axis;

said diverging section having a predetermined length effective for substantially matching a pressure of said fan bypass air at said nozzle exit with a pressure of said airflow; and said converging-diverging nozzle, said downstream inner surface portion of said fan cowl and said conical aft portion of said core cowl being effective for causing said dividing streamline to slope radially inwardly from said aftmost end of said fan cowl for reducing aerodynamic drag during aircraft cruise operation.

4. For an aircraft of the type having a gas turbofan engine mounted below a wing, said engine having a fan cowl including a forward portion that radially surrounds a fan section and an aft portion radially spaced from and surrounding a forward portion of a core cowl defining therebetween a fan air bypass duct mounted around a central engine axis, said bypass duct having a duct exit for exhausting fan bypass air over said core cowl in a generally aft direction, said fan bypass air forming a dividing streamline with ambient airflow flowing over an outer surface of said fan cowl during aircraft cruise operation, said streamline extending in an aft direction from an aftmost end of said fan cowl, an improved engine bypass air exhaust system comprising:

the core cowl further including a conical aft portion having an outer radius steadily decreasing from a position of maximum radius forward of said duct exit to an aft end of said core engine cowl; the aft portion of the fan cowl further including an aft inner surface at a downstream end of said bypass duct and extending to said duct exit thereof, said aft inner surface extending aft and radially inwardly from a position opposite said position of maximum radius of said core cowl;

said aft inner surface of said fan cowl and said outer surface of said core cowl defining therebetween a portion of said bypass duct including a converging-diverging nozzle extending to said duct exit and having a nozzle throat disposed upstream of said duct exit at said position of maximum radius of said core cowl, a converging section disposed upstream of said nozzle throat and a diverging section disposed downstream of said nozzle throat; and said diverging section of said bypass duct having an increasing flow area distribution and a predetermined length for the purpose of generally matching bypass air pressure to outside air pressure during aircraft cruise operation;

said converging-diverging nozzle, said aft inner surface of said fan cowl and said conical aft portion of said core cowl being effective for causing said dividing streamline to slope radially inwardly from said aftmost end of said fan cowl for reducing aerodynamic drag during aircraft cruise operation.

* * * * *